(12) United States Patent
Sasaki

(10) Patent No.: US 7,796,879 B2
(45) Date of Patent: Sep. 14, 2010

(54) AUTOFOCUS SYSTEM

(75) Inventor: Tadashi Sasaki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 614 days.

(21) Appl. No.: 11/713,041

(22) Filed: Mar. 2, 2007

(65) Prior Publication Data
US 2007/0217777 A1 Sep. 20, 2007

(30) Foreign Application Priority Data
Mar. 14, 2006 (JP) .............................. 2006-069864

(51) Int. Cl.
| G03B 13/02 | (2006.01) |
| G03B 13/16 | (2006.01) |
| G03B 13/24 | (2006.01) |
| G03B 17/18 | (2006.01) |
| G03B 17/20 | (2006.01) |
| H04N 5/232 | (2006.01) |

(52) U.S. Cl. ................ 396/148; 396/147; 396/150; 396/296; 348/346; 348/350

(58) Field of Classification Search ............... 396/148, 396/79, 89, 124, 125, 150, 296, 147; 348/346, 348/350
See application file for complete search history.

(56) References Cited

U.S. PATENT DOCUMENTS 4,812,912 A    3/1989 Iida et al.

2004/0165879 A1    8/2004 Sasaki et al.
2006/0109371 A1*   5/2006 Sasaki et al. ............... 348/360

FOREIGN PATENT DOCUMENTS

| EP | 1017232 A1 | 7/2000 |
| EP | 1560425 A1 | 8/2005 |
| JP | 2002-365519 A | 12/2002 |
| WO | WO-02/099496 A1 | 12/2002 |

* cited by examiner

*Primary Examiner*—Rochelle-Ann J Blackman
(74) *Attorney, Agent, or Firm*—Birch, Stewart, Kolasch & Birch, LLP

(57) ABSTRACT

The present invention provides an autofocus system comprising: a lens device interchangeably attached to a camera and provided with an autofocus device which controls focus so that a subject within a predetermined AF area range within the image-taking range of the camera is focused; a controller which is connected to the lens device as an accessory device and which gives AF area information specifying the AF area range to the autofocus device, the autofocus system; an AF area information acquisition device which acquires the AF area information given to the autofocus device from the controller; and an AF area display device which visibly displays the AF area range in a picture taken by the camera based on the AF area information acquired by the AF area information acquisition device.

20 Claims, 5 Drawing Sheets

AUTOFOCUS SYSTEM

BACKGROUND OF THE INVENTION

1. Field of the Invention

The present invention relates to an autofocus system, and in particular to an autofocus system in which an AF area, a range to be targeted by focusing in autofocusing (AF) within the image-taking range of a camera, is displayed in a view finder or the like of the camera.

2. Description of the Related Art

In an image-taking system which converts the image of a subject to an electric signal (an image signal) by an image-taking element (such as a CCD), like a TV camera, a contrast method is generally adopted as an autofocus (hereinafter referred to as AF) method. The contrast method is a method in which the contrast of the image of a subject is detected from an image signal (a picture signal) of the image of the subject acquired by the imaging element, and focusing is automatically performed to obtain the best focus state by controlling the focus of a photographing lens (a focusing lens) so that the contrast becomes the highest.

In the contrast method AF, the whole image-taking range of a camera is not targeted by focusing in AF, but only a subject within a partial range of the image-taking range is targeted by focusing in many cases. For example, from the image signal of a subject image effectively taken by an image-taking element, the image signal within a predetermined range targeted by AF is extracted, and focusing is controlled so that the contrast of the image becomes highest based on the image signal within the extracted range. Thereby, the target of AF is limited to a subject within the partial range. In this specification, the range targeted by AF is referred to as an AF area, and a frame indicating the range of the AF area (the outline of the AF area) is referred to as an AF frame.

For example, there is also proposed an autofocus system in which the position and the like of the AF area can be changed by an operator's operation, and the range of the AF area is displayed by an AF frame or the like on the screen of a view finder, as in Japanese Patent Application Laid-Open No. 2002-365519.

SUMMARY OF THE INVENTION

In general, a TV camera system for broadcasting is configured by a camera (a camera head) provided with an image-taking element, a predetermined signal processing circuit and the like, a lens device to be interchangeably attached to the camera (an interchangeable lens), a view finder for displaying a picture signal of a taken picture or the like outputted from the camera, and the like. Among such TV camera systems, there is known a TV camera system in which the lens device is provided with an AF function to enable focusing by AF. There is also known a TV camera system provided with an AF area display function of the camera acquiring AF area information indicating the range of the AF area (the position, the size and the like) from the lens device, synthesizing the image of an AF frame on a taken image based on the AF area information, for example, and displaying the synthesis in a view finder.

However, there are cameras which are not provided with the AF area display function. In the case of using the camera which is not provided with the AF area display function, a cameraman cannot recognize which position and which size the AF area is set at in the current image-taking range when the AF area range is changed. Therefore, it is necessary, in the case where the lens device is provided with the function of changing the AF area range but the camera is not provided with the AF area display function, to disable change of the AF area range by fixing the AF area, for example, at a predetermined size in the center of the screen in order to prevent occurrence of a trouble that the currently set AF area range cannot be recognized.

The present invention has been made in consideration of the above situation, and its object is to provide an autofocus system which makes it possible to display the AF area range to be recognized by an operator even in the case of using a camera which is not provided with the AF area display function.

In order to achieve the above object, the autofocus system according to a first aspect is an autofocus system comprising: a lens device interchangeably attached to a camera and provided with an autofocus device which controls focus so that a subject within a predetermined AF area range within the image-taking range of the camera is focused; a controller which is connected to the lens device as an accessory device and which gives AF area information specifying the AF area range to the autofocus device, the autofocus system; an AF area information acquisition device which acquires the AF area information given to the autofocus device from the controller; and an AF area display device which visibly displays the AF area range in a picture taken by the camera based on the AF area information acquired by the AF area information acquisition device.

According to the present invention, since the AF area range in a picture taken by a camera is visually displayed even when the camera is not provided with the AF area display function, a cameraman can change the AF area range while recognizing the currently set AF area range. Furthermore, since the currently set AF area range is recognized by acquiring the AF area information outputted from the controller, it is possible to visually display the AF area range by a system according to the present invention even when the AF area information cannot be acquired from the lens device or the camera.

The autofocus system according to a second aspect is the invention described in the first aspect, wherein the controller is provided with a connector to be connected to the lens device and a connector for giving the AF area information to the AF area information acquisition device separately. The present invention indicates one aspect of the configuration of the controller for acquiring the AF area information from the controller.

The autofocus system according to a third aspect is the invention described in the first or second aspects, wherein the AF area display device includes: a picture signal acquisition device which acquires, from the camera, a picture signal indicating a picture taken by the camera; a synthesis device which, by synthesizing the image signal of an AF frame indicating the AF area range on the picture signal acquired by the picture signal acquisition device based on the AF area information acquired by the AF area information acquisition device, generates a synthesized image in which the AF frame image indicating the AF area range in the image taken by the camera is synthesized on the taken image; and an output device which outputs a picture signal indicating the synthesized image generated by the synthesis device to a monitor.

The present invention indicates one aspect for visibly displaying the AF area range in a picture taken by a camera. According to this aspect, a synthesized image is generated in which the image of an AF frame indicating the AF area range is superimposed on a picture taken by a camera, and the synthesized image is displayed on a monitor.

The autofocus system according to a fourth aspect is the invention described in the third aspect, wherein the monitor to which the output device outputs the picture signal is a view finder for displaying an image taken by the camera. The present invention shows a case where the monitor for displaying the taken picture on which the AF frame is synthesized is a view finder used for a cameraman to check the composition for photographing.

The autofocus system according to a fifth aspect is the invention described in the third or fourth aspect, wherein the AF area information acquisition device, the picture signal acquisition device, the synthesis device and the output device are provided in one apparatus separate from the lens device, the camera, the controller and the monitor, and the apparatus includes a connector to be connected to the camera to acquire the picture signal of a picture taken by the camera, a connector to be connected to the controller to acquire the AF area information from the controller and a connector to be connected to the monitor to give the picture signal of the synthesized image to the monitor.

According to the present invention, acquisition of the AF area information from the controller, acquisition of the picture signal of a taken picture from the camera, processing for synthesizing the image of an AF frame on the taken picture, output of the synthesized image to a monitor and the like are performed in one apparatus, and it is possible to easily construct a system according to the present invention only by connecting the apparatus to the controller, the camera and the monitor.

The autofocus system according to a sixth aspect is the invention described in any of the first to fifth aspects, further comprising: an AF area fixation device which fixes the AF area range at the center of the image-taking range when the camera to which the lens device is attached is not provided with an AF area display function of displaying the AF area range in a taken picture; and a release device which releases fixation of the AF area by the AF area fixation device when detecting that the AF area information acquisition device has been connected to the controller, even if the camera to which the lens device is attached is not provided with the AF area display function.

According to the present invention, in the case where the camera is not provided with the AF area display function, but the function of fixing the AF area range at the center of the image-taking range is provided, fixation of the AF area is automatically released if the AF area range can be displayed as in the first to fifth aspects.

The autofocus system according to a seventh aspect is the invention described in any of the first to fifth aspects, further comprising: an AF area fixation device which fixes the position, size and form of the AF area at a predetermined state when the camera to which the lens device is attached is not provided with an AF area display function of displaying the AF area range in a taken picture; and a release device which releases fixation of the AF area by the AF area fixation device when detecting that the AF area information acquisition device has been connected to the controller, even if the camera to which the lens device is attached is not provided with the AF area display function.

In comparison with the invention according to the sixth aspect, the present invention indicates an aspect in which the position, size and form of the AF area are fixed at a predetermined state, unlike the aspect in which the AF area fixation function fixes the AF area at the center of the image-taking range.

According to the autofocus system of the present invention, the AF area range can be recognizably displayed even in the case of using a camera which is not provided with the AF area display function and in the case where it is impossible to acquire the AF area information from a camera or a lens device.

DETAILED DESCRIPTION OF THE PREFERRED EMBODIMENTS

Embodiments of an autofocus system according to the present invention will be described in detail below with reference to accompanying drawings.

Figure 1:
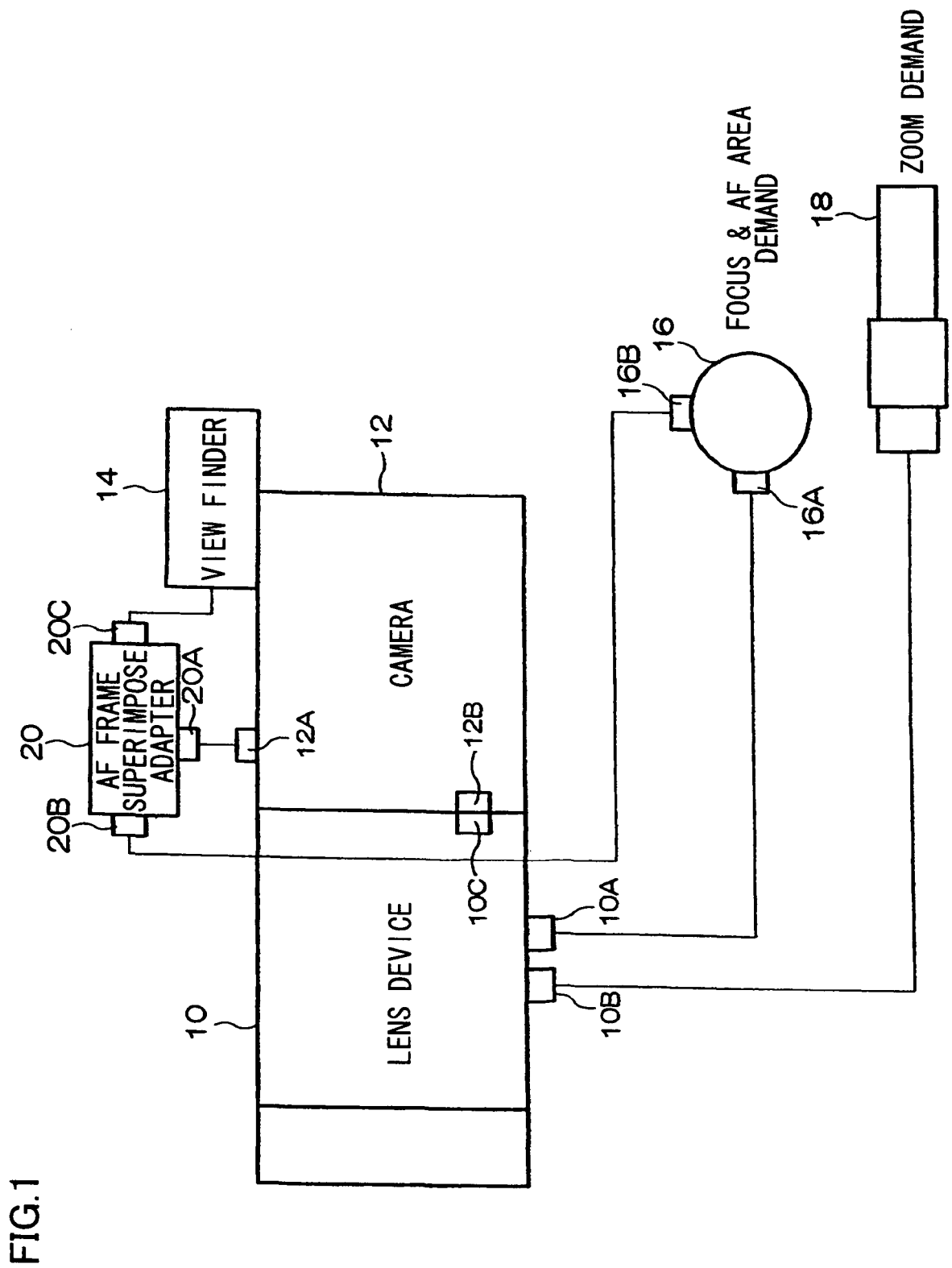
FIG. 1 is an external configuration diagram showing an embodiment of a TV camera system in which an auto-focus system according to the present invention is incorporated.

FIG. 1 is an external configuration diagram of an embodiment of a TV camera system in which an autofocus system according to the present invention is incorporated. In the figure, a lens device 10 is provided with an optical system including optical parts such as a focus lens group, a zoom lens group and a diaphragm, and a control system for controlling the optical system. A lens cone holding the optical parts of the optical system is coupled with the optical system of a lens-interchangeable camera (a camera head) 12 for TV broadcasting.

On the camera 12, an image-taking element such as a CCD and a predetermined signal processing circuit are mounted. A subject image is formed on the image-taking surface of the image-taking element of the camera 12 by the optical system of the lens device 10, and the subject image is photoelectrically converted by the image-taking element. Then, predetermined signal processing is performed by the signal processing circuit for the signal outputted from the image-taking element. Thereby, the image (picture) of the subject is taken, and the picture signal of the taken picture is generated.

To the camera 12, a view finder 14 is attached which is to be used for a cameraman to perform composition checking and the like of a picture to be taken. To the view finder 14, for example, a picture signal of a picture currently taken by the camera 12 is given via an AF frame superimpose adapter 20 to be described later. The taken picture is displayed on the screen of the view finder 14.

The lens device 10 is provided with connectors 10A and 10B for connecting lens accessories. To the connector 10A, a connector 16A of a focus & AF area demand 16 is connected via a cable. To the connector 10B, a zoom demand 18 is connected via a cable. In the focus & AF area demand 16, operations related to focusing or operations related to the AF area, which is the range to be targeted by AF in an autofocus (AF) function, are performed. In the zoom demand 18, operations related to zooming are performed. Command signals and the like corresponding to various operations are transmitted from each of the demands 16 and 18 to the lens device 10.

At the connection part between the lens device 10 and the camera 12, a connector 10C and a connector 12B are provided on the lens device 10 side and on the camera 12 side, respectively. These connectors 10C and 12B are arranged on the connection part on the rear surface of the lens device 10 and on the front surface of the camera 12, respectively. When the lens device 10 is connected to the camera 12 in a condition that the lens cone (the optical system) of the lens device 10 is coupled to the optical system on the camera 12 side, these connectors 10C and 12B are directly connected not via a cable or the like. Exchange of necessary information between the lens device 10 and the camera 12 is performed through these connectors 10C and 12B. For example, the lens device 10 is provided with an AF function of automatically performing focusing by the contrast-method autofocus (AF) based on a picture signal of a taken picture generated by the camera 12, and the picture signal to be used by the AF function is acquired from the camera 12 to the lens device 10 via the connectors 10C and 12B. A diaphragm control signal and the like for the lens device 10 are also given from the camera 12 to the lens device 10 via these connectors 10C and 12B.

The camera 12 is provided with a connector 12A which outputs a picture signal for displaying a currently taken picture in the view finder 14. To the connector 12A, a connector 20A of the AF frame superimpose adapter 20 is connected via a cable. To a connector 20B of the AF frame superimpose adapter 20, a connector 16B of the focus & AF area demand 16 is connected via a cable, and to a connector 20C of the AF frame superimpose adapter 20, the view finder 14 is connected via a cable.

Here, the camera 12 of this embodiment is of a type which is not provided with a function of displaying the AF area range on the screen (on a taken picture) of the view finder 14, even if AF area information indicating the AF area range (for example, the range determined by the position, size and form of the AF area within the image-taking range) is acquired. For example, if the camera 12 is provided with the AF area display function of displaying the AF area range in the view finder 14 based on the AF area information obtained from the lens device 10, the AF area range is displayed in the view finder 14 by directly connecting the view finder 14 to the connector 12A of the camera 12 via a cable or the like. When it is not necessary to display the AF area range in the view finder 14, the view finder 14 is directly connected to the connector 12A of the camera 12 via the cable.

From the connector 16B of the focus & AF area demand 16, the AF area information indicating the same range as the range of the AF area specified to the lens device 10 is outputted as information indicating the AF area range currently set in the AF control of the lens device 10. The AF area information is given to the AF frame superimpose adapter 20. The AF frame superimpose adapter 20 generates a picture signal in which an AF frame (the image of an AF frame) indicating the range (outline) of the AF area is superimposed (synthesized) on a taken picture, from the AF area information and the picture signal acquired from the connector 12A of the camera 12, the details of which will be described later. The picture signal of the taken picture on which the AF frame is synthesized is outputted from the connector 20C of the AF frame superimpose adapter 20, and the picture signal is given to the view finder 14 connected to the connector 20C. Thereby, in the view finder 14, not only the picture being taken by the camera 12 but also the AF frame indicating the currently set AF area range is displayed, being superimposed on the taken picture.

Figure 2:
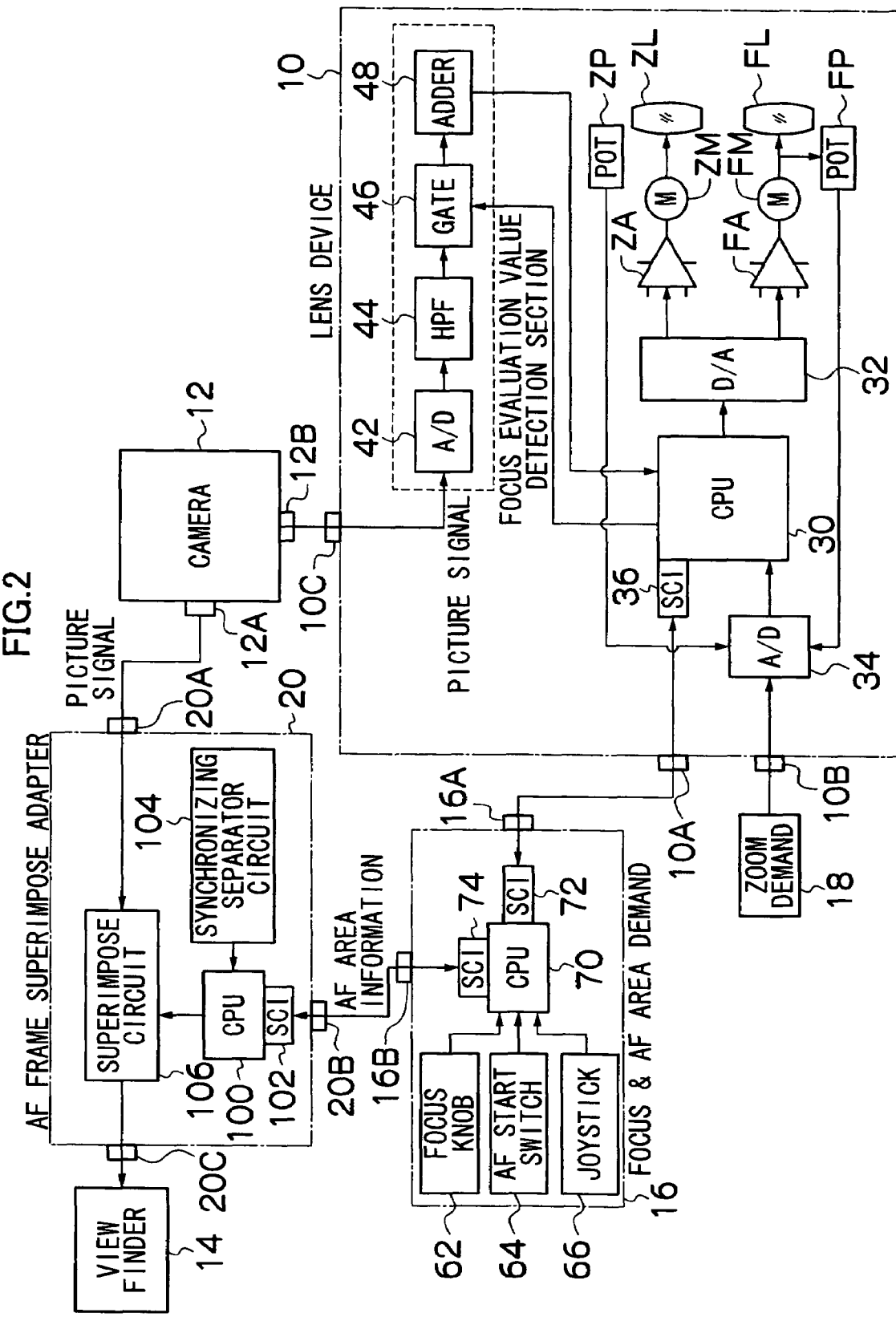
FIG. 2 is a block diagram showing the configuration of processing blocks mainly related to an AF function in the TV camera system in FIG. 1.

FIG. 2 is a block diagram showing the configuration of processing blocks mainly related to the AF function in the above TV camera system. In the figure, motors FM and ZM, potentiometers FP and ZP and the like are coupled with a focus lens group FL and a zoom lens group ZL arranged in the optical system of the lens device 10, respectively. The focus lens group FL and the zoom lens group ZL are driven by the motors FM and ZM, respectively, and a position signal of voltage corresponding to each setting position is outputted from each of the potentiometers FP and ZP.

On the lens device 10, a CPU 30 for performing overall control of the whole apparatus is mounted. To the CPU 30, amplifiers FA and ZA connected to the motors FM and ZM, respectively, are connected via a D/A converter 32. The CPU 30 controls the rotation speed of each of the motors FM and ZM based on the value of a drive signal given to each of the amplifiers FA and ZA, and it can also control the focus lens group FL and the zoom lens group ZL so that they are set at desired positions and at operation speeds, by acquiring the position signal outputted from each of the potentiometers FP and ZP via an A/D converter 34.

The focus & AF area demand 16 connected to the connector 10A of the lens device 10 via a cable and the connector 16A can exchange various signals with the CPU 30 of the lens device 10 through a serial communication interface (SCI) 36. Control of the focus lens group FL (focus control) can be switched between autofocus (AF) and manual focus (MF), and during MF, focus control is performed in accordance with a focus command signal given by the focus & AF area demand 16, the details of which will be described later. That is, during MF, the CPU 30 reads the value of a focus command signal given by the focus & AF area demand 16 and, assuming the value of the focus command signal to be, for example, a value indicating a target position, moves the focus lens group FL to a position corresponding to the value.

A zoom command signal is outputted from the zoom demand 18 connected to the connector 10B of the lens device 10 via a cable, and the zoom command signal is read by the CPU 30 via the A/D converter 34. Control of the zoom lens group ZL (zoom control) is performed in accordance with a zoom command signal given by the zoom demand 18. The CPU 30 assumes the value of the zoom command signal given by the zoom demand 18 to be, for example, a value indicating a target speed, and moves the zoom lens group ZL at a speed corresponding to the value.

A diaphragm I not shown is arranged in the optical system of the lens device 10, and control of the diaphragm is performed by the CPU 30 controlling a motor not shown based in an iris signal given from the camera 12. The iris signal is outputted from the connector 12B of the camera 12, and the iris signal inputted from the connector 10A of the lens device 10 is read by the CPU 30.

Figure 3:
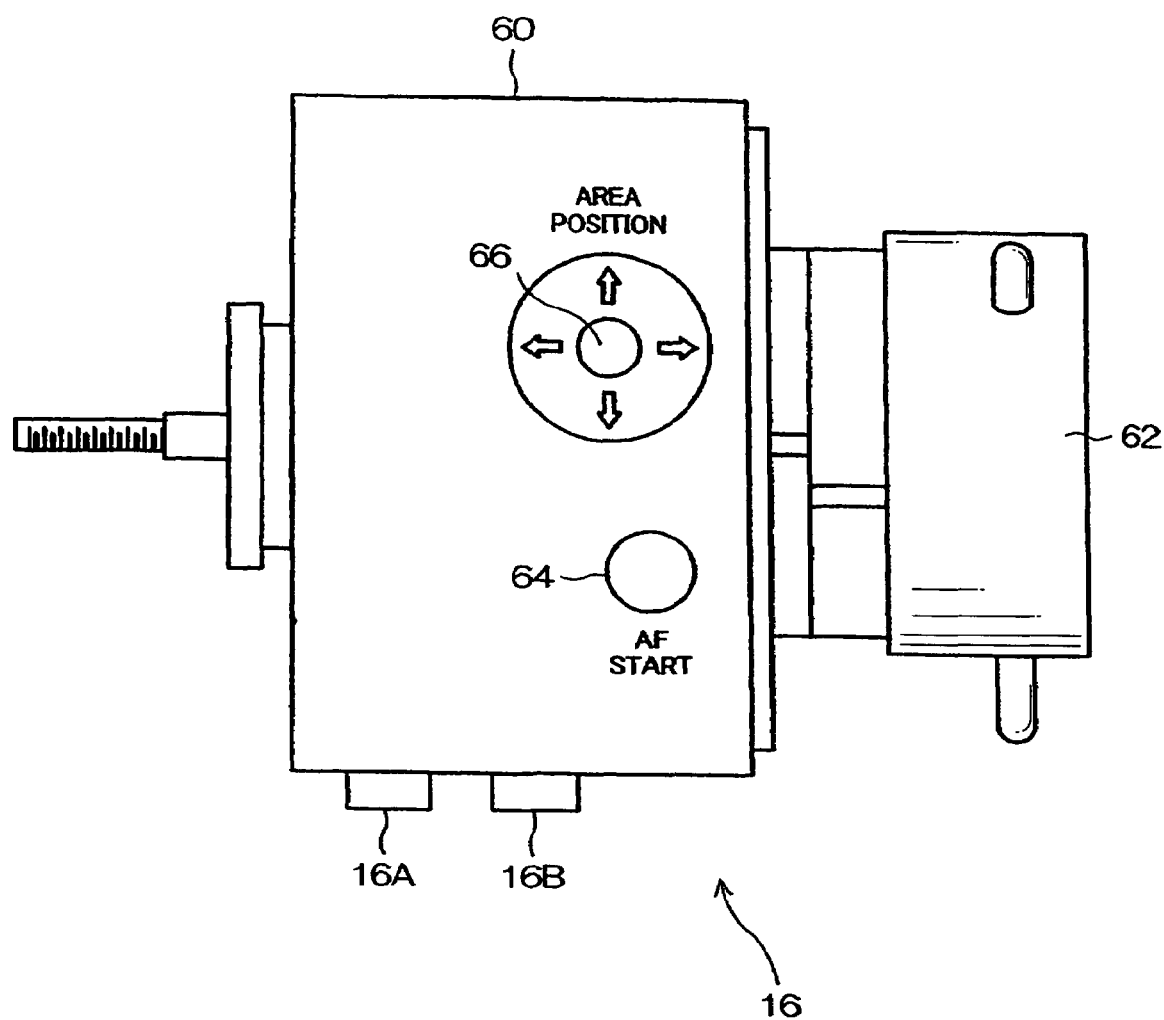
FIG. 3 is an external configuration diagram of a focus & AF area demand.

The configuration and processings related to focus control will be described in detail below. The focus & AF area demand 16 is configured as shown in FIG. 3. As shown in the figure, the focus & AF area demand 16 is provided with a cylindrical body section 60 which includes various circuits, and a focus knob 62 is rotatably provided on the body section 60. As shown in FIG. 1, the connector 16A of the body section 60 is a connector connected to the connector 10A of the lens device 10 via a cable, and the connector 16B on the connector 16A side is a connector connected to the connector 20B of the AF frame superimpose adapter 20 via a cable.

As shown in FIG. 2, a CPU 70 is mounted on the focus & AF area demand 16, and the rotation position of the focus knob 62 is read by the CPU 70 via a potentiometer not shown. The CPU 70 can exchange various signals with the CPU 30 of the lens device 10 via an SCI 72 and the SCI 36, and a focus command signal with a value corresponding to the rotation position of the focus knob 62 is transmitted from the CPU 70 to the CPU 30 of the lens device 10. As described above, during MF, the focus lens group FL is controlled in accordance with the focus command signal.

In an AF start switch 64 is arranged on the circumference surface of the body section 60 of the focus & AF area demand 16. The AF start switch 64 is a switch for starting AF control, and the on/off state of the AF start switch 64 is read by the CPU 70 of the focus & AF area demand 16 shown in FIG. 2. When the AF start switch 64 is turned on during MF, a signal indicating that the AF start switch 64 has been turned on is transmitted from the CPU 70 to the CPU 30 of the lens device 10, and AF control is started by the CPU 30. Meanwhile, when an operation of rotating the focus knob 62 is performed during AF, and the value of the focus command signal given from the CPU 70 to the CPU 30 of the lens device 10 changes, the control is switched to MF control. The switching between AF and MF is not limited to the method of this embodiment. For example, it may be performed by a switch for selecting the AF mode or the MF mode.

In FIG. 3, a joystick 66 is provided on the circumference surface of the body section 60 of the focus & AF area demand 16 as an operation member related to the AF area. This will be described later.

In FIG. 2, during AF control, focusing information (a focus evaluation value) detected by a focus evaluation value detection section 40 mounted on the lens device 10 is read by the CPU 30, and the focus lens group FL is controlled based on the focusing information. As shown in FIG. 1, the picture signal of a picture currently taken by the camera 12 is outputted from the connector 12B of the camera 12, and the picture signal is inputted from the connector 10C of the lens device 10. The picture signal inputted from the connector 10C of the lens device 10 is acquired into the focus evaluation value detection section 40.

The focus evaluation value detection section 40 is configured by an A/D converter 42, a high-pass filter (HPF) 44, a gate circuit 46, an addition circuit 48 and the like. The picture signal acquired into the focus evaluation value detection section 40 is first converted to a digital signal by the A/D converter 42. Then, only a high-frequency component is extracted from the picture signal by the high-pass filter (HPF) 44 and inputted to the gate circuit 46. Then, only the signal within the range of the AF area set in the image-taking range is extracted by the gate circuit 46. The range of signal extraction by the gate circuit 46 (the AF area range) is set by a specification signal from the CPU 30.

The high-frequency component signals within the AF area extracted by the gate circuit 46 are accumulated by the addition circuit 48 field by field, and the accumulated value is given to the CPU 30 as a focus evaluation value.

The focus evaluation value obtained in this way is a value for evaluating the height of the contrast of a picture (a subject image) within the AF area, which is being taken by the camera 12, and the CPU 30 controls the focus lens group FL so that the focus evaluation value obtained from the focus evaluation value detection section 40 becomes the largest (the maximum). For example, a direction in which the focus evaluation value increases is detected by slight vibration of the focus lens group FL, which is called wobbling, and the focus lens group FL is moved in that direction. At a position where the increase of the focus evaluation value is not detected any more, the focus lens group FL is stopped. Thereby, the focus lens group FL is set at a position where the contrast of the subject image within the AF area becomes the largest, and the subject within the AF area is focused.

Figure 4:
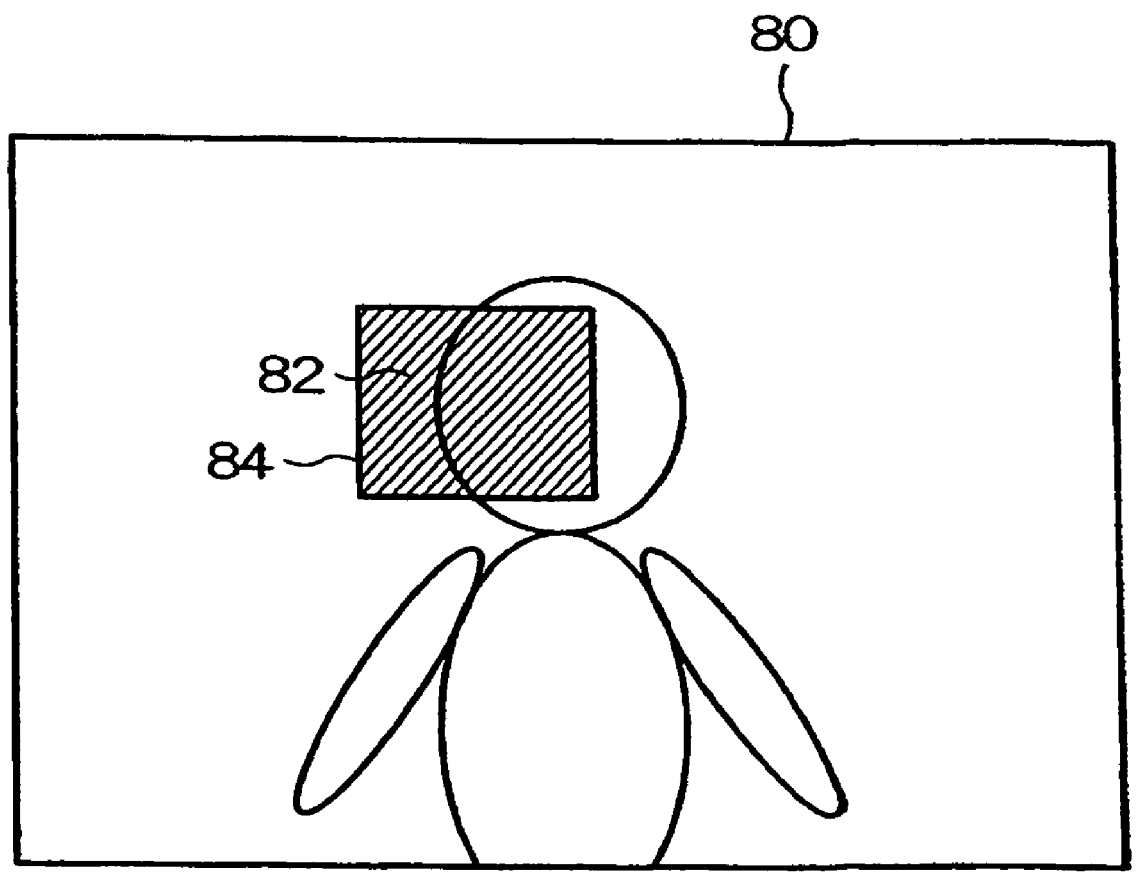
FIG. 4 is an explanatory diagram used for describing an AF area.

Now, the AF area will be described. If the range of a subject or a subject image which can be effectively taken by the image-taking element of the camera 12 is assumed to be the image-taking range, an AF area 82, which is the range to be targeted by AF, is set as the range within, for example, a quadrangular AF frame 84 in the image-taking range (the range in a frame 80) as shown in FIG. 4. The image-taking range corresponds to the screen range of a picture obtained by reproducing and displaying a subject image (the picture) taken by the image-taking element of the camera 12 on the screen such as the view finder 14.

The range of the AF area 82 in the image-taking range is set by the CPU 30 in consideration of, for example, the position (the central position), size and form of the AF area 82. In this embodiment, it is assumed that the form of the AF area 82 is fixed to a quadrangle with a predetermined horizontal to vertical ratio, and that the size of the AF area 82 is also fixed to a predetermined size. Meanwhile, the position of the AF area 82 can be changed to a desired position by an operator operating the joystick 66 of the focus & AF area demand 16 shown in FIG. 3.

The angle of forward, backward (upper, lower), rightward or leftward inclination of the joystick 66 is detected by the CPU 70 of the focus & AF area demand 16 shown in FIG. 2 via a potentiometer not shown. The CPU 70 detects a forward, backward, rightward or leftward operation direction of the joystick 66 based on the inclination angle of the joystick 66. Then, the position of the AF area 82 within the image-taking range is changed from the currently set position in accordance with the operation direction. For example, when the joystick 66 is operated in the left direction when seen from the position facing it, the position of the AF area 82 (the AF frame 84) is moved in the left direction by a predetermined distance in the image-taking range 80 in FIG. 4. Similarly, when the joystick 66 is operated in each of the rightward, forward and backward directions, the position of the AF area 82 is also moved in each of the right, upward and downward directions by a predetermined distance similarly to the operation direction. It is also possible to continuously change the position of the AF area 82 by, when a predetermined period of time of operating the joystick 66 in a certain direction has elapsed, moving the position of the AF area 82 in the same direction as the operation direction by a predetermined distance each time. It is also possible that the moving speed of the AF area 82 increases in accordance with the amount of operation (the inclination angle) of the joystick 66.

If the position of the AF area 82 is changed in accordance with an operation of the joystick 66, the CPU 70 transmits AF area information indicating the position of the changed new AF area 82 and the predetermined size and form of the AF area 82, that is, AF area information indicating the range of the AF area to the SCI 36 of the lens device 10 via the SCI 72 to give the AF area information to the CPU 30 of the lens device 10. It is also possible that the data indicating the predetermined size and form of the AF area 82 is recognized by the CPU 30 of the lens device 10, and the focus & AF area demand 16 transmits only the data indicating the position of the AF area 82 to the lens device 10 as the AF area information.

The CPU 30 of the lens device 10 sets the range of the AF area based on the position, size and form of the AF area shown by the AF area information and gives a specification signal specifying the set AF area range as the signal extraction range, to the gate circuit 46 of the focus evaluation value detection section 40. Thereby, the picture signal within the AF area range is extracted by the gate circuit 46, and a focus evaluation value for the subject image within the AF area is given to the CPU 30 from the focus evaluation value detection section 40.

In the case of enabling the size or the form of the AF area to be changed by operating a predetermined operation member corresponding to each of the size and the form, in addition to the position of the AF area, the size or the form of the AF area is changed based on the operation of the operation member by the focus & AF area demand 16, and data indicating the changed size or form of the AF area is given to the CPU 30 of the lens device 10 from the focus & AF area demand 16 as the AF area information.

The focus & AF area demand 16 is provided with the connector 16B for transmitting AF area information indicating the same AF area range as in the AF area information transmitted to the lens device 10 to external equipment. As shown in FIG. 1, the connector 20B of the AF frame superimpose adapter 20 is connected to this connector 16B via a cable.

As described above, the AF area range currently set in the lens device 10 is displayed in the view finder 14 via this AF frame superimpose adapter 20. To describe the AF area superimpose adapter 20, the connectors 20A and 20B of the AF frame superimpose adapter 20 are connected to the connector 12A of the camera 12 and the connector 16B of the focus & AF area demand 16, respectively, via cables, and the connector 20C of the AF frame superimpose adapter 20 is connected to the view finder 14 via a cable, as shown in FIG. 1.

As shown in FIG. 2, a CPU 100, an SCI 102, a synchronizing separator circuit 104, a superimpose circuit 106 and the like are mounted on the AF frame superimpose adapter 20. The CPU 100 can exchange various signals with the CPU 70 of the focus & AF area demand 16 through the SCI 102, and thereby, the CPU 100 acquires AF area information indicating the same AF area range as in the AF area information transmitted to the lens device 10, from the CPU 70 of the focus & AF area demand 16.

Meanwhile, a picture signal of a taken picture is outputted from the connector 12A of the camera 12, and the picture signal is inputted not only to the superimpose circuit 106 but also to the synchronizing separator circuit 104. In the synchronizing separator circuit 104, a vertical synchronizing signal and a horizontal synchronizing signal are separated from the inputted picture signal, and the synchronizing signals are acquired into the CPU 100.

The CPU 100 generates an image signal of an AF frame (a frame indicating the outline of an AF frame) with a size and a form to be fitted to the AF area range indicated by the AF area information, based on the AF area information acquired from the focus & AF area demand 16. Then, the CPU 100 outputs the image signal to the superimpose circuit 106. The CPU 100 also determines the timing of outputting the image signal of the AF frame to the superimpose circuit 106 so that the image signal of the AF frame is superimposed (synthesized) on the picture signal of the taken picture inputted to the superimpose circuit 106, at the position on the picture signal corresponding to the position of the AF area indicated by the AF area information, based on the synchronizing signals acquired from the synchronizing separator circuit 104. Then, at the timing of performing replacement with the image signal of the AF frame, of the picture signal of the taken picture, the CPU 100 outputs a switching signal indicating that the picture signal of the taken picture is to be replaced with the picture signal of the AF frame, to the superimpose circuit 106. Thereby, in the superimpose circuit 106, a picture signal of the taken picture on which the image of the AF frame with the size and the form indicated by the AF area information is superimposed (synthesized) is generated at the position of the AF area indicated by the AF area information in the taken picture. This embodiment is on the assumption that the AF area is a quadrangle with a predetermined size, and therefore, the AF frame image is the image of a quadrangular frame with a predetermined size.

Figure 5:
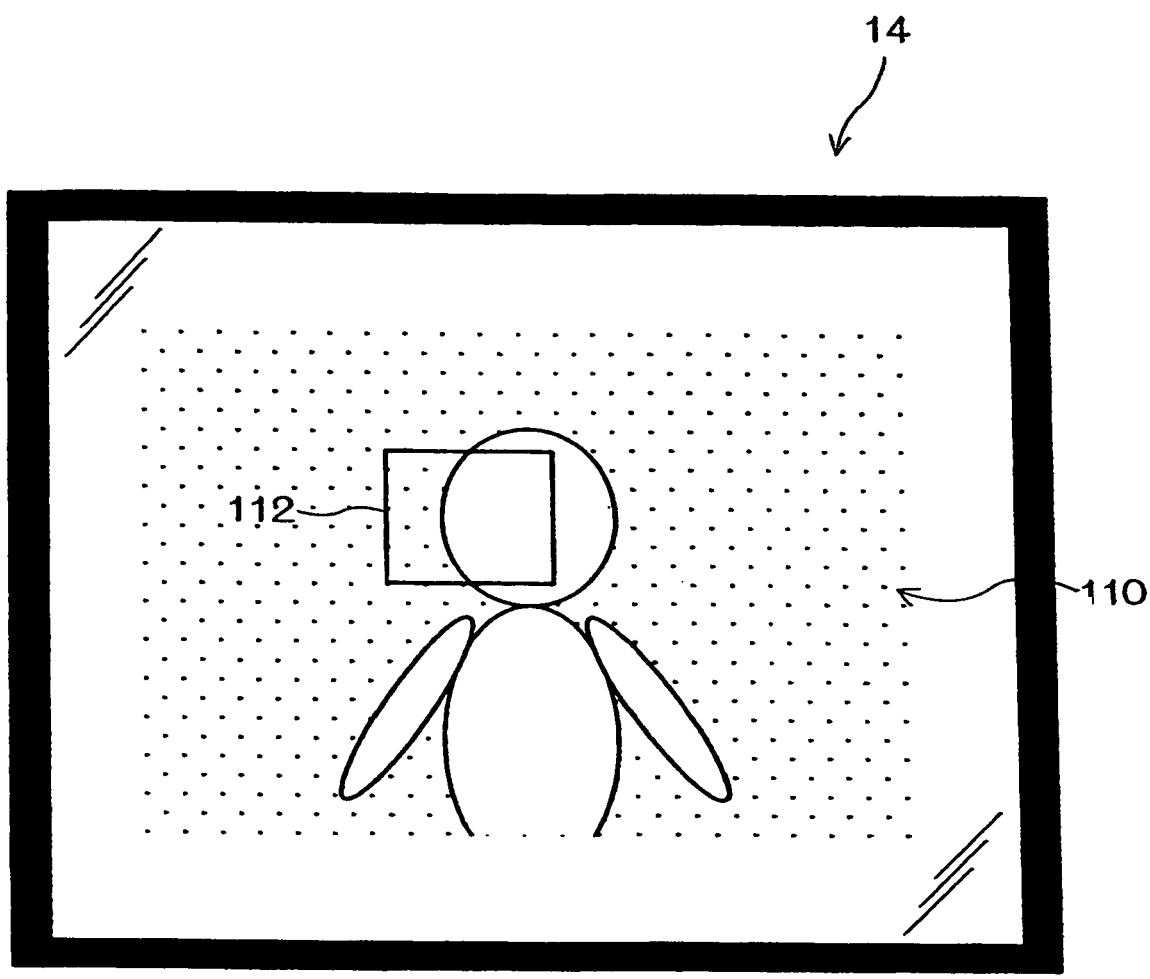
FIG. 5 is a diagram showing the image of an AF frame displayed in a view finder.

The picture signal generated by the superimpose circuit 106 is outputted to the view finder 14. Thereby, a currently taken picture 110 and the image of an AF frame 112 indicating a currently set AF frame range are displayed being overlapped with each other on the screen of the view finder 14, as shown in FIG. 5.

As described above, even in the case where the camera 12 is not provided with the AF area display function, it is possible to display a picture in which an AF frame is superimposed on a taken picture in the view finder 14 by using the AF frame superimpose adapter 20. Therefore, a cameraman can recognize the currently set AF area range from the display and easily change the AF area to a desired range (with a desired position and the like).

It is also conceivable to make it possible to transmit the AF area information from the lens device 10 to the camera 12 through a line connected between the connector 10C of the lens device 10 and the connector 12B of the camera 12 in consideration of a case where the camera 12 is provided with the AF area display function. However, there may be a case where the camera 12 is not provided with the AF area display function though the connector 10C of the lens device 10 and the connector 12B of the camera 12 are directly connected as in the above embodiment. In this case, the AF area information outputted from the connector 10C of the lens device 10 cannot be acquired into the AF frame superimpose adapter 20. However, if the AF area information is directly acquired from the focus & AF area demand 16 as in the above embodiment, it is advantageously possible to display the AF area range together with a taken picture in the view finder 14 even when the connector 10C of the lens device 10 and the connector 12B of the camera 12 are directly connected.

The lens device 10 or the focus & AF area demand 16 may be provided with a function of, when detecting that the camera 12 is not provided with the AF area display function, fixing the position, size and form of the AF area to a predetermined state (an AF area fixation function). For example, the position of the AF area is fixed at the center of the screen with a predetermined size and form (or only the position of the AF area is fixed at the center of the screen), and, even if an operation of changing the position and the like of the AF area is performed by the focus & AF area demand 16, the operation is ineffective.

When the lens device 10 is provided with the AF area fixation function, whether or not the camera 12 is provided with the AF area display function is automatically detected, for example, by exchange of information with the camera 12 or by the state of a predetermined switch to be manually operated. When the camera 12 is not provided with the AF area display function, the CPU 30 of the lens device 10 inhibits change of the position and the like of the AF area and fixes the AF area to a predetermined state, irrespective of the AF area information from the focus & AF area demand 16.

When the focus & AF area demand 16 is provided with the AF area fixation function, whether or not the camera 12 is provided with the AF area display function is automatically detected, for example, by exchange of information with the camera 12 via the lens device 10 or by the state of a predetermined switch to be manually operated. The CPU 70 of the focus & AF area demand 16 transmits the AF area information indicating a predetermined position and the like of the AF area to the lens device 10 and fixes the position and the like of the AF area, irrespective of an operation of the operation member for operating the AF area (the joystick 66).

In such a case, the following is possible that: the CPU 30 of the lens device 10 or the CPU 70 of the focus & AF area demand 16 detects whether or not the AF frame superimpose adapter 20 has been connected to the connector 16B of the focus & AF area demand 16 (whether or not a device which acquires the AF area information has been connected to the connector 16B) via the focus & AF area demand 16; and when it is detected that the AF frame superimpose adapter 20 has been connected, the AF area fixation function of the tens device 10 or the focus & AF area demand 16 is automatically released.

In the above embodiment, an aspect has been described in which only the position of the AF area can be changed by the focus & AF area demand 16. In addition to the position, the size and form of the AF area may be changed by an operation of the focus & AF area demand 16, as the factors for determining the AF area range. Operations related to focusing and operations related to the AF area may be performed not by the same controller (lens accessory) but by separate controllers. Alternatively, the operations may be performed by a controller of a different kind, such as the zoom demand 18.

Furthermore, though the AF area range is indicated by an AF frame in the above embodiment, an aspect is also possible in which the AF area range is displayed by a method other than a frame.

Furthermore, though an AF frame is displayed being superimposed on a taken picture displayed on the screen of the view finder 14, it is also possible to install a transparent liquid crystal display at the front face of the screen of the view finder 14 and superimpose an AF frame on a taken picture by displaying the AF frame on the liquid crystal display.

Furthermore, though the AF frame superimpose adapter 20 in this embodiment acquires the AF area information from the connector 16B different from the connector 16A connected to the lens device 10 of the focus & AF area demand 16, this is not limiting. For example, a device for branching a signal line is connected to the connector 16A of the focus & AF area demand 16 connected to the connector 10A of the lens device 10. Then, one signal line branched by the device is connected to the connector 10A of the lens device 10, and the other is connected to the connector 20B of the AF frame superimpose adapter 20, so that the AF area information outputted from the focus & AF area demand 16A can be acquired by the AF frame superimpose adapter 20.

The present invention can be applied to AF of a method other than the contrast method used in the above embodiment.

What is claimed is:

1. An autofocus system comprising:
   a lens device interchangeably attached to a camera and provided with an autofocus device which controls focus so that a subject within a predetermined AF area range within the image-taking range of the camera is focused;
   a controller which is connected to the lens device as an accessory device and which gives AF area information specifying the AF area range to the autofocus device, the autofocus system;
   an AF area information acquisition device which acquires from the controller the AF area information given to the autofocus device by the controller, and superimposes the AF area range on a picture taken by the camera; and
   an AF area display device which receives from the AF area information acquisition device the superimposed AF area range and picture taken by the camera and visibly displays the AF area range in the picture taken by the camera.

2. The autofocus system according to claim 1, wherein the controller is provided with a connector to be connected to the lens device and a connector for giving the AF area information to the AF area information acquisition device separately.

3. The autofocus system according to claim 1, wherein the AF area display device includes:
   a picture signal acquisition device which acquires, from the camera, a picture signal indicating the picture taken by the camera;
   a synthesis device which, by synthesizing the image signal of an AF frame indicating the AF area range on the picture signal acquired by the picture signal acquisition device based on the AF area information acquired by the AF area information acquisition device, generates a synthesized image in which the AF frame image indicating the AF area range in the image taken by the camera is synthesized on the taken image; and
   an output device which outputs a picture signal indicating the synthesized image generated by the synthesis device to a monitor.

4. The autofocus system according to claim 2, wherein the AF area display device includes:
   a picture signal acquisition device which acquires, from the camera, a picture signal indicating the picture taken by the camera;
   a synthesis device which, by synthesizing the image signal of an AF frame indicating the AF area range on the picture signal acquired by the picture signal acquisition device based on the AF area information acquired by the AF area information acquisition device, generates a synthesized image in which the AF frame image indicating the AF area range in the image taken by the camera is synthesized on the taken image; and
   an output device which outputs a picture signal indicating the synthesized image generated by the synthesis device to a monitor.

5. The autofocus system according to claim 3, wherein the monitor to which the output device outputs the picture signal is a view finder for displaying an image taken by the camera.

6. The autofocus system according to claim 4, wherein the monitor to which the output device outputs the picture signal is a view finder for displaying an image taken by the camera.

7. The autofocus system according to claim 3, wherein the AF area information acquisition device, the picture signal acquisition device, the synthesis device and the output device are provided in one apparatus separate from the lens device, the camera, the controller and the monitor, and the apparatus includes a connector to be connected to the camera to acquire the picture signal of a picture taken by the camera, a connector to be connected to the controller to acquire the AF area information from the controller and a connector to be connected to the monitor to give the picture signal of the synthesized image to the monitor.

8. The autofocus system according to claim 4, wherein the AF area information acquisition device, the picture signal acquisition device, the synthesis device and the output device are provided in one apparatus separate from the lens device, the camera, the controller and the monitor, and the apparatus includes a connector to be connected to the camera to acquire the picture signal of a picture taken by the camera, a connector to be connected to the controller to acquire the AF area information from the controller and a connector to be connected to the monitor to give the picture signal of the synthesized image to the monitor.

9. The autofocus system according to claim 5, wherein the AF area information acquisition device, the picture signal acquisition device, the synthesis device and the output device are provided in one apparatus separate from the lens device, the camera, the controller and the monitor, and the apparatus includes a connector to be connected to the camera to acquire the picture signal of a picture taken by the camera, a connector to be connected to the controller to acquire the AF area information from the controller and a connector to be connected to the monitor to give the picture signal of the synthesized image to the monitor.

10. The autofocus system according to claim 6, wherein the AF area information acquisition device, the picture signal acquisition device, the synthesis device and the output device are provided in one apparatus separate from the lens device, the camera, the controller and the monitor, and the apparatus includes a connector to be connected to the camera to acquire the picture signal of a picture taken by the camera, a connector to be connected to the controller to acquire the AF area information from the controller and a connector to be connected to the monitor to give the picture signal of the synthesized image to the monitor.

11. The autofocus system according to claim 1, further comprising:
an AF area fixation device which fixes the AF area range at the center of the image-taking range when the camera to which the lens device is attached is not provided with an AF area display function of displaying the AF area range in a taken picture; and
a release device which releases fixation of the AF area by the AF area fixation device when detecting that the AF area information acquisition device has been connected to the controller, even if the camera to which the lens device is attached is not provided with the AF area display function.

12. The autofocus system according to claim 2, further comprising:
an AF area fixation device which fixes the AF area range at the center of the image-taking range when the camera to which the lens device is attached is not provided with an AF area display function of displaying the AF area range in a taken picture; and
a release device which releases fixation of the AF area by the AF area fixation device when detecting that the AF area information acquisition device has been connected to the controller, even if the camera to which the lens device is attached is not provided with the AF area display function.

13. The autofocus system according to claim 3, further comprising:
an AF area fixation device which fixes the AF area range at the center of the image-taking range when the camera to which the lens device is attached is not provided with an AF area display function of displaying the AF area range in a taken picture; and
a release device which releases fixation of the AF area by the AF area fixation device when detecting that the AF area information acquisition device has been connected to the controller, even if the camera to which the lens device is attached is not provided with the AF area display function.

14. The autofocus system according to claim 5, further comprising:
an AF area fixation device which fixes the AF area range at the center of the image-taking range when the camera to which the lens device is attached is not provided with an AF area display function of displaying the AF area range in a taken picture; and a release device which releases fixation of the AF area by the AF area fixation device when detecting that the AF area information acquisition device has been connected to the controller, even if the camera to which the lens device is attached is not provided with the AF area display function.

15. The autofocus system according to claim 7, further comprising:
an AF area fixation device which fixes the AF area range at the center of the image-taking range when the camera to which the lens device is attached is not provided with an AF area display function of displaying the AF area range in a taken picture; and
a release device which releases fixation of the AF area by the AF area fixation device when detecting that the AF area information acquisition device has been connected to the controller, even if the camera to which the lens device is attached is not provided with the AF area display function.

16. The autofocus system according to claim 1, further comprising:
an AF area fixation device which fixes the position, size and form of the AF area at a predetermined state when the camera to which the lens device is attached is not provided with an AF area display function of displaying the AF area range in a taken picture; and
a release device which releases fixation of the AF area by the AF area fixation device when detecting that the AF area information acquisition device has been connected to the controller, even if the camera to which the lens device is attached is not provided with the AF area display function.

17. The autofocus system according to claim 2, further comprising:
an AF area fixation device which fixes the position, size and form of the AF area at a predetermined state when the camera to which the lens device is attached is not provided with an AF area display function of displaying the AF area range in a taken picture; and
a release device which releases fixation of the AF area by the AF area fixation device when detecting that the AF area information acquisition device has been connected to the controller, even if the camera to which the lens device is attached is not provided with the AF area display function.

18. The autofocus system according to claim 3, further comprising:
an AF area fixation device which fixes the position, size and form of the AF area at a predetermined state when the camera to which the lens device is attached is not provided with an AF area display function of displaying the AF area range in a taken picture; and
a release device which releases fixation of the AF area by the AF area fixation device when detecting that the AF area information acquisition device has been connected to the controller, even if the camera to which the lens device is attached is not provided with the AF area display function.

19. The autofocus system according to claim 5, further comprising:
an AF area fixation device which fixes the position, size and form of the AF area at a predetermined state when the camera to which the lens device is attached is not provided with an AF area display function of displaying the AF area range in a taken picture; and
a release device which releases fixation of the AF area by the AF area fixation device when detecting that the AF area information acquisition device has been connected to the controller, even if the camera to which the lens device is attached is not provided with the AF area display function.

20. The autofocus system according to claim 7, further comprising:

an AF area fixation device which fixes the position, size and form of the AF area at a predetermined state when the camera to which the lens device is attached is not provided with an AF area display function of displaying the AF area range in a taken picture; and a release device which releases fixation of the AF area by the AF area fixation device when detecting that the AF area information acquisition device has been connected to the controller, even if the camera to which the lens device is attached is not provided with the AF area display function.

* * * * *